Figure 1:
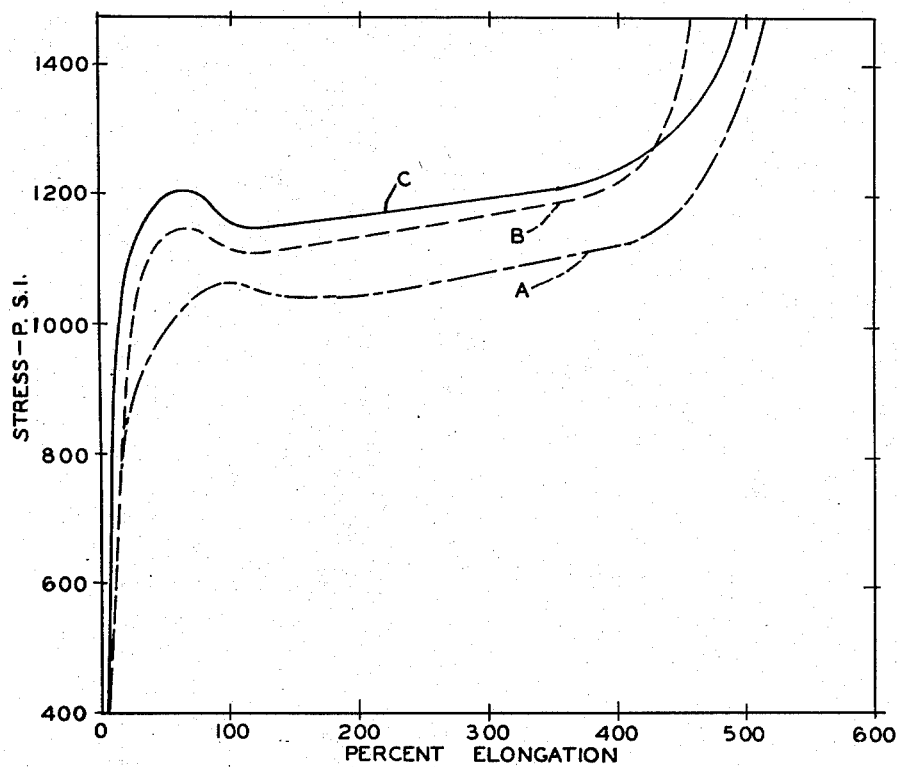

United States Patent Office 2,695,769
Patented Nov. 30, 1954

2,695,769

METHOD OF RELIEVING STRESSES IN PLASTICS

George E. Henning, Baltimore, Md., assignor to Western Electric Company, Incorporated, New York, N. Y., a corporation of New York Application March 5, 1952, Serial No. 275,000

4 Claims. (Cl. 254—134.3)

This invention relates to methods of relieving stresses in plastics, and more particularly to methods of eliminating stresses liable to cause cracking in shaped bodies of organic thermoplastic polymers.

Many thermoplastic compounds, when formed into shaped bodies, frequently exhibit a troublesome tendency to crack. The cause of such cracking can be attributed to the destructive releasing of internal stresses stored within the body. Such internal stresses may be gradually released over a period of time as the body ages. However, the effect may be initiated sooner or intensified when the body is subjected to relatively slight impacts, or is exposed to very low temperatures or to certain chemical agents having the power to penetrate the body of plastic material. In its lesser aspects, the release of such stresses is manifested by shallow cracking on the surface of the body, usually termed "crazing." In its more serious aspects, this effect is manifested by deep cracking or even complete breakage of the body.

Stresses may be created and stored within a body of thermoplastic material as a result of strains occurring during mechanical distortion of the body. Such forming procedures as molding and extrusion, wherein the material is necessarily subjected to great strains, inevitably cause stresses to be present in the bodies formed in this manner. However, stresses caused by extrusion of plastic materials into cable sheaths, for example, and stresses caused by pure stretching of a plastic in one direction only, generally are insufficient in themselves to cause subsequent rupture of the resulting body, although they may cause some superficial surface cracking or crazing.

However, when a plastic cable sheath, for example, is subjected to biaxial stresses, that is, stresses in two directions at right angles, the likelihood of the cable sheath rupturing is greatly increased. Such biaxial stresses are created when a plastic body, such as a cable sheath, is bent, particularly when it is bent around a short radius. Such bending is likely to occur when a cable sheath is withdrawn from a cable reel, or is turned around corners while it is being introduced into a manhole or a cable duct. Stresses present in an extruded plastic cable sheath, for example, that are introduced by the extruding process obviously will tend to aid the stress imparted by bending in causing the cable sheath, or the like, to rupture.

The presence of stresses stored in certain plastics, such as polyethylene, can be determined by observing them by means of polarized light. One convenient way of making such an observation is to view the body through a polarized plastic sheet. The stress lines are clearly evident when the body is viewed in this manner.

The ability of thermoplastic polymers to store stresses internally has been explained by citing the long relaxation time of these substances. Synthetic resins, in general, have much longer relaxation times than do many natural polymers. Hence, they are much more capable of retaining stored stresses tending to cause cracking. The phenomenon of cracking is noticeably more troublesome in the case of bodies having large cross-sections or massive and irregular shapes. A thin sheet of plastic material having a tendency to crack may be folded back and forth a great many more times before cracking occurs than would be the case for a thick sheet of such plastic material.

Cables employed in the telephone industry frequently are provided with outer protective coverings of polyethylene. In the manufacture of such cables, they are wound upon reels from which they may be uncoiled and led through ducts at an installation location. As the convolutions of the cable straighten out, stresses are introduced in the sheath. These stresses alone may be sufficient to cause cracking of the sheath. When the cable is further flexed or bent to pass it through manholes and around corners in a duct, the polyethylene sheath covering the cable is necessarily mechanically distorted still further, and cracking may occur. It has been found that, despite every precaution taken during the manufacture of the cable, these results might nevertheless occasionally ensue. Many remedies proposed in the known plastics art have been employed during and shortly after the manufacturing operations, but the unfavorable results observed during installation of the cable persisted.

The fact that stresses may be created and stored in a shaped body of plastic material as a result of strains occurring during an extrusion or a molding operation has long been recognized in the plastics art. In the past, various remedies have been advocated for alleviating these strains in such manner that the character of the shaped plastic body would not be changed and cracking would be prevented. For example, it has been proposed that after the heat associated with a molding operation has been dissipated, a plastic body may be subsequently reheated to a temperature just below the softening point of the plastic material and held at such temperature for a suitable time. It has also been found that internal stresses in an extruded plastic body may be eliminated by passing the body directly from the extruder into a zone in which it is heated for a short time to a temperature substantially higher than the extrusion temperature. These and other remedial measures have met with varying degrees of success.

None of the remedies heretofore known have proved to be effective in eliminating failures found to occur during the installation of plastic-jacket communications cables. At field locations these cables must be unwound from supply reels and be twisted or bent to some extent in order to install them properly inside of ducts. Flexing of the cable sheath in this manner may sometimes accelerate the spontaneous release of internal stresses stored therein, resulting in a badly split sheath. While a split may not appear at the instant a cable is flexed, the life expectancy of an intact cable sheath in this condition is generally undesirably short.

An object of the invention is to provide new and improved methods of relieving stresses in plastic compounds.

Another object of the invention is to provide new and improved methods of eliminating stresses liable to cause cracking in shaped bodies of organic thermoplastic polymers.

A further object of the invention is to provide new and improved methods of preventing cracks from occurring in thermoplastic sheaths on communication cables when the cables are being installed.

One method illustrating certain features of the invention and by means of which cracking may be prevented in shaped bodies of aged plastics having internal stresses stored therein comprises heating such a body sufficiently to relieve the internal stresses therein.

Figure 2:
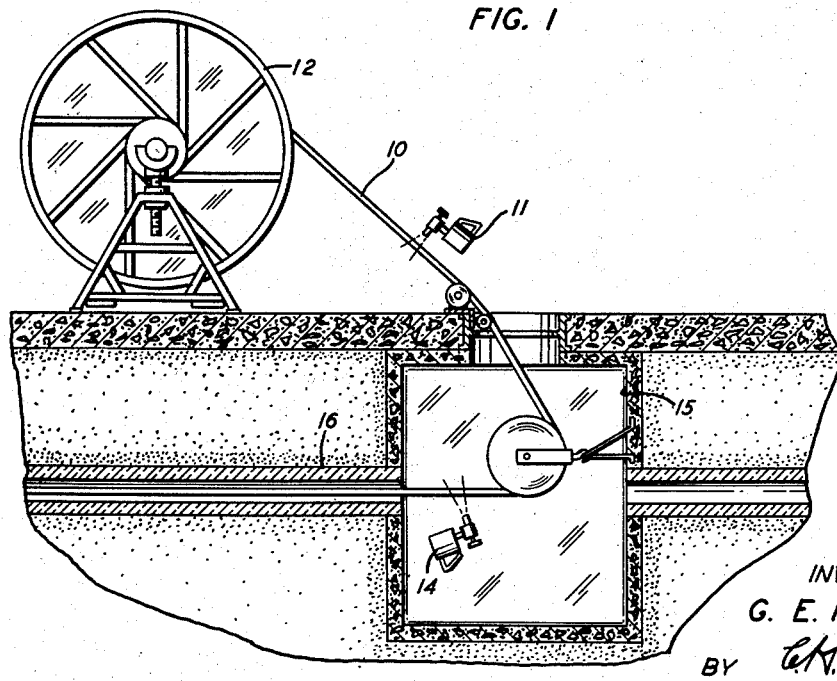

A complete understanding of the invention may be obtained from the following detailed description of methods forming specific embodiments thereof, when read in conjunction with the appended drawing, in which:

Fig. 1 depicts curves representing stress-strain diagrams for extruded sheaths of polyethylene, some of which have been treated in accordance with the present invention, and Fig. 2 is a schematic illustration of a method embodying the invention being applied to a communications cable as it is being installed in a duct.

In attacking the problem of preventing failures in polyethylene cable sheaths, it was at first thought that the quality of the material in the extruded sheath might be at fault. It was believed that the properties of the extruded sheath might be improved by improving the homogeneity of the material, by modifying the structure of the extruders, by employing different extrusion temperatures, or by altering the plasticity of the extruded product. A number of experiments were made to determine the susceptibility to cracking of extruded sheaths produced according to different procedures.

Cracking of the sheaths was deliberately promoted by employing a chemical reagent known as "Igepal CA", a commercially obtainable alkyl-aryl polyglycol ether wetting agent, having the power to penetrate the body of the plastic sheath and release the cohesive forces therein. During these experiments, it was observed that when samples were coated with "Igepal" shortly after they were extruded, no cracks developed. This behavior was so unexpected that it led to an investigation of the possibility that aging of the plastic sheath might affect the susceptibility of the sheaths to cracking.

As a result of tests made on samples of polyethylene sheaths taken at various times after extrusion and subjected to various treatments, it was determined that the aging effect is indeed a highly influential factor on the susceptibility of formed plastic bodies to cracking. When samples taken from a polyethylene sheath of about 0.075 inch thickness extruded onto a cable having a diameter of about 1.72 inches were tested by exposing them to the "Igepal" cracking reagent, it was found that two hours after extrusion the sheath was not susceptible to cracking. However, after four hours some susceptibility appeared and increased daily up to a maximum at an age of about fourteen days. At and beyond the fourteen day age, sheath failures ran between 75% and 100%. Samples cut from a polyethylene sheath which had been aged fourteen days proved to be about five times as sensitive to "Igepal" as samples taken from a sheath only twenty-four hours old.

During the application of the "Igepal" cracking reagent to the samples of polyethylene sheaths in these tests, the sheaths were also stretched beyond the elastic limit of the plastic material. In one type of test used, extruded sheaths stripped from cables were cut into six inch lengths and folded flat before the "Igepal" was applied. In another series of tests, tubular rings one inch long were cut from sheaths and folded different degrees from an amount at which no cracking occurred to an extent that 100 percent failures were observed. A third series of tests were performed by bending 36 inch lengths of cable having extruded sheaths of selected ages thereon.

It was deduced that if cracking were caused by the disruptive release of stresses when the material was stretched beyond its elastic limit, and if aging were a controlling factor, then it would be possible to eliminate such failures in cable sheaths by relaxing the stored stresses by a suitable heat treatment after aging had occurred. Pursuing this conjecture, it was found that a high temperature treatment of short duration applied to an aged cable sheath immediately after distortion had occurred was outstandingly successful in preventing cracking of the sheaths. It was also noted that a limited amount of improvement was obtained by heat treating the sheathed cable soon after it was manufactured, but the effectiveness of this treatment proved to be decidedly inferior in comparison with the results obtainable by heat treating the cable after age-hardening had occurred.

It appears that heat treating the cable sheath soon after it is manufactured is effective to relax stresses imparted by the extrusion operation and the winding of the cable onto a reel, and this treatment may overcome to some extent the effect that makes itself manifest when the cable is unwound from the reel and flexed during its installation in a duct. However, the cable may be subjected to such severe distortion due to the handling it receives after it has been wound on a reel and aged that a heat treatment applied shortly after the plastic sheath is applied may be ineffective to prevent cracking of the sheath due to such distortion. Consequently, in order to avoid sheath failures, the cable sheath should be heat treated in the field at the time of its installation, even though it may have been heat treated at its place of manufacture.

Comparative data were compiled concerning the stress-strain relationships existing in polyethylene sheaths when unaged, aged, and properly heat treated after aging. The resulting diagrams are illustrated in Fig. 1, wherein the solid line curve A represents unaged sheath, the dotted line curve B represents aged sheath, and the dot-and-dash line curve C represents sheath that has been heated after aging. The lower yield point and higher ultimate elongation of the unaged sheath, when contrasted with the corresponding characteristics of aged sheath, clearly show the effects of aging. It is evident that the ultimate elongation of heat treated aged sheath lies about midway between the other two, thereby showing the beneficial effect of the heat treatment. It is also clear that the treatment raises the yield point as well as the tensile strength and elongation of the material.

Various means could be used for heat treating the polyethylene sheath on cables. For example, radiant heat from an electrical resistance, infrared lamps, steam, hot water, or hot melt waxes or plasticizers could be employed. Since polyethylene is not readily combustible, the most convenient and practical method is to heat the sheath momentarily by the direct application of a flame from a burner, such as a blowtorch. The great practical advantage of the flame treatment method is that it can be utilized in the field with a minimum of equipment during the installation of a cable. The heating should be continued sufficiently long and should be sufficiently intense to insure the release of the internal stresses in the sheath, or at least to diminish them enough to render them incapable of rupturing the sheath at a later time. The sheath may have its external surface glazed by the heating step without impairing the sheath.

The time and temperature employed are not too critical and will depend upon the kind of plastic material employed in making the sheath, the thickness of the sheath, and the nature of the core beneath the sheath. This is illustrated by the results obtained in heat treating sections of communication cables having an outside diameter of 1.72 inch, and an outer polyethylene sheath having a thickness of 0.075 inch.

In carrying out one series of experiments, a cable that had been stored on a reel long enough for it to become aged was withdrawn from the reel and cut into three foot long sections. These sections then were straightened to completely remove the bow-shape that they assumed immediately after having been removed from the cable reel. The straightening of the cable due to its withdrawal from the reel, and the further straightening to remove the bow-shape from the sections, strained the cable sections and introduced internal stresses within the polyethylene sheath.

One of these three foot long sections was slowly rotated and advanced through the flame produced by a gas burner made from a 1¼ inch pipe 18 inches long having a series of holes drilled therein at one-half inch intervals. This section was slowly rotated and advanced along the burner over a period of about thirty seconds. The section was allowed to stand for approximately 10 days, and then bent to a radius of about 7 inches. "Igepal" was applied to the bent section, and no failure of the sheath was observed.

This experiment was repeated a number of times, and in almost all instances the cable sheath remained intact. No appreciable difference was observed when the cable section was passed through the flame over a period of time greater than thirty seconds, or over a period of time somewhat less than thirty seconds. When the cable was so advanced through the flame at the rate of three feet in thirty seconds, the surface of the cable sheath was heated at the rate of approximately seven square inches per second.

In another experiment, a similar section of cable was heated slightly over a gas flame, and then was bent so sharply that the region of greatest curvature had a radius of about 4 inches. The section was then flame treated until a uniform glazed surface of the polyethylene sheath was obtained. The sample was cooled for about five minutes, and then "Igepal" was applied. No cracking of the sheath was observed. When similar samples were bent to radii larger than 4 inches, that is, of the order of about 7 inches, without being heat treated, and then were coated with "Igepal," the samples almost invariably cracked badly.

It was found, as a result of these experiments, that with a cable of this construction, it was unnecessary to actually time the heat treating operation, but that generally satisfactory results were obtained when the cable sheath was heated sufficiently to convert the somewhat rough and dull surface of the sheath resulting from the extrusion process to a shiny, glazed surface. Hence, in field operations, no complicated timing means would be required to obtain satisfactory results.

As shown schematically in Fig. 2, a cable 10 sheathed with aged polyethylene can be flame treated by a blowtorch 11 as it is unwound from a reel 12 to remove stresses caused by the straightening of the convolutions thereon. The blowtorch 11 is played over the entire surface of the sheath in order to insure equalized heating of the sheath. It is recommended that the cable also be flame treated by a blowtorch 14 after it has been fed through a manhole 15, and before it is advanced into an underground duct 16, in order to alleviate stresses caused by the flexing of the cable while imparting another configuration to it in the duct. It is advisable to cool the sheath after the first flame treatment or after both flame treatments, either by the application of water or by providing sufficient travel of the cable to allow air cooling to take place.

The cables that are provided with polyethylene sheaths and utilized in the telephone industry are kept wound upon reels during storage periods and during their shipment from a manufacturing plant or warehouse to any one of numerous field locations distributed across the nation. While the cable is in transit and stored on the reel, its sheath gradually stiffens and attains a set as aging takes place. Since more than fourteen days normally elapse between the time a sheathed cable is manufactured and the time it is installed at a field location, the full effect of aging usually will have occurred, and a heat treatment in accordance with methods embodying the present invention becomes essential if cracking of the sheath is to be avoided.

A flame treatment of a cable sheath at the time a cable is being installed may incidentally cause an additional beneficial effect. As the heat of the flame fuses the outer surface of the sheath to a glossy finish, any surface scratches or abrasions on the sheath that may have resulted while it was in transit will be heat sealed or totally eliminated. Since it is quite possible that deep seated scuff marks may sometimes aggravate the environmental conditions that might lead to cracking of a cable sheath, it is highly desirable to remove such marks before installation is completed.

Another factor that should be considered in controlling the cracking of cable sheaths is the permissible amount that a cable may be bent as it is manipulated during its installation. In the standard instructions for installing cable issued in the telephone industry, it is recommended that cables larger than one inch in diameter should not be bent to radii less than 12 inches. In one of the tests performed during the investigation that resulted in the present invention, it was found that a specimen of 1.72 inch diameter cable having a fully aged polyethylene sheath thereon would show no cracking when bent to a 4 inch radius and coated with "Igepal," provided the sheath had been properly flame treated after it was bent. The results of this test indicate the remarkable efficacy of methods embodying the invention even under extremely detrimental conditions.

The present invention can be utilized to relieve stresses stored in any organic thermoplastic polymer that exhibits the characteristic of aging. Of course, in the case of readily inflammable polymers, the heat treatment used should not be the flame treatment method. The thermoplastic polymers contemplated include polyethylene, polystyrene, and other polyvinyl compounds.

It is obvious that methods embodying the invention could be successfully applied to any shaped article composed of thermoplastic polymers, and that the application of the invention is not limited merely to polyethylene jacketed communication cables.

What is claimed is:

1. The method of installing cables having external polyethylene sheaths thereon and which have been stored while wound on reels over periods of at least fourteen days thereby causing the sheaths to become age-hardened, which comprises unwinding such a cable from its supporting reel and introducing the cable into a manhole whereby internal stresses are created in the age-hardened polyethylene sheath, locally heating the sheath sufficiently to relieve said internal stresses therein, and then advancing the cable into a cable duct.

2. The method of installing cables having external polyethylene sheaths thereon and which have been stored while wound on reels over periods of at least fourteen days thereby causing the sheaths to become age-hardened, which comprises unwinding such a cable from its supporting reel, applying a blowtorch flame directly to successive portions of the surface of the sheath while the cable unwinds for a period of time sufficient to relieve internal stresses created in the sheath during unwinding of the cable, feeding the cable into a manhole, applying a blowtorch flame directly to successive portions of the surface of the plastic sheath in the manhole until no deleterious internal stresses remain in the sheath, and then advancing the cable into a cable duct.

3. The method of preventing cracking in extruded polyethylene cable sheaths which have been wound into coils and stored undisturbed for a period of at least fourteen days thereby causing the sheaths to become age-hardened, which comprises unwinding such a coil, and as it leaves the coil applying to the sheath sufficient heat to relieve any internal stresses created by distortion of the age-hardened sheath while it is being unwound.

4. The method of preventing cracking in external polyethylene sheaths extruded onto communications cables which have been wound into coils and then stored undisturbed for a period of at least fourteen days thereby causing the sheaths to become age-hardened, which comprises unwinding such a coil, and moving the cable through a flame applied directly to the sheath while the cable is being unwound, to glaze the outer surface of the sheath and relieve any internal stresses created in the age-hardened sheath while it is being unwound.

References Cited in the file of this patent

UNITED STATES PATENTS

| Number | Name | Date |
|---|---|---|
| 1,735,301 | Short | Nov. 12, 1929 |
| 2,176,153 | Semon | Oct. 17, 1939 |
| 2,217,451 | Patnode | Oct. 8, 1940 |
| 2,248,840 | Wilkoff | July 8, 1941 |
| 2,317,409 | Seaton | Apr. 27, 1943 |
| 2,532,504 | Lapsley | Dec. 5, 1950 |